Figure 6:
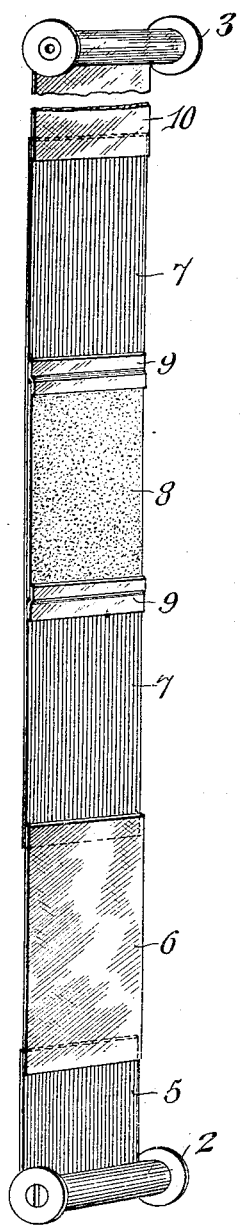

R. LANG.
FOCUSING MEANS FOR FILM CAMERAS.
APPLICATION FILED FEB. 9, 1915.
1,202,294.
Patented Oct. 24, 1916.
2 SHEETS—SHEET 1.
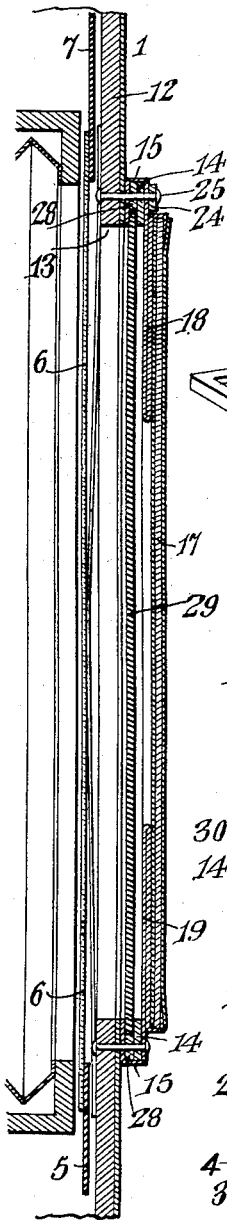
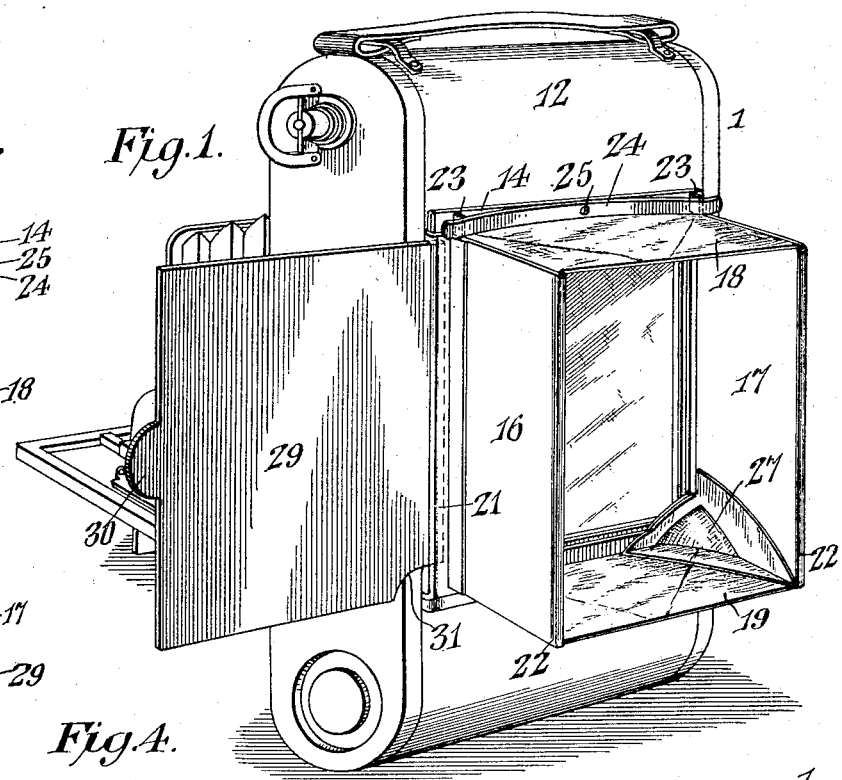
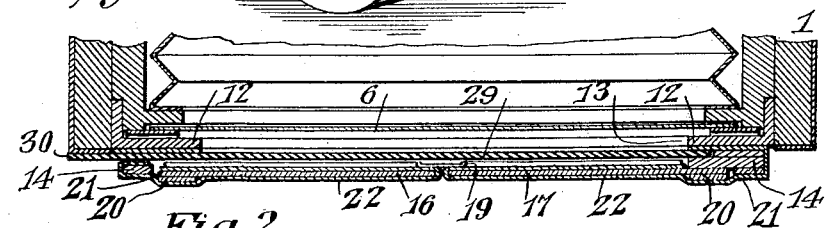
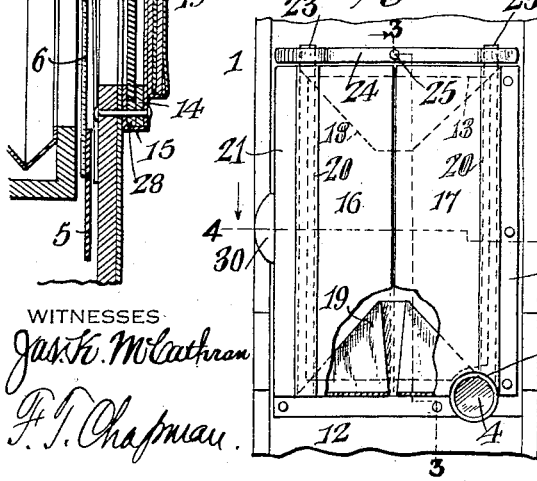
WITNESSES
Robert Lang, INVENTOR
BY
ATTORNEY

R. LANG.
FOCUSING MEANS FOR FILM CAMERAS.
APPLICATION FILED FEB. 9, 1915.

1,202,294.

Patented Oct. 24, 1916.
2 SHEETS—SHEET 2.

WITNESSES
Jas. E. McCathran
F. T. Chapman

Robert Lang, INVENTOR
BY E. G. Siggers
ATTORNEY

UNITED STATES PATENT OFFICE.

ROBERT LANG, OF SHAMOKIN, PENNSYLVANIA.

FOCUSING MEANS FOR FILM-CAMERAS.

1,202,294. Specification of Letters Patent. Patented Oct. 24, 1916.

Application filed February 9, 1915. Serial No. 7,163.

*To all whom it may concern:*

Be it known that I, ROBERT LANG, a citizen of the United States, residing at Shamokin, in the county of Northumberland and State of Pennsylvania, have invented a new and useful Focusing Means for Film-Cameras, of which the following is a specification.

This invention has reference to focusing means for film cameras, and its object is to provide a means whereby the image may be accurately focused in a camera of the named type without interference with or by the film, and the invention is particularly adapted to cameras employing roll films.

In accordance with the present invention the film strip is a sectional strip so far as the sensitive surfaces are concerned, and these sensitive surfaces intersperse with flexible focusing screens arranged to move in the same focal plane as the sensitive surfaces. Between the focusing screens and the sections of sensitive film there are provided suitable lengths of opaque material which may consist of the usual black or other non-actinic paper. A focusing film roll will, therefore, comprise terminal lengths of black paper, which will be considered as the opaque material employed, with a length of flexible translucent or semi-transparent material, such as tracing linen or suitably treated paper, followed in order by a length of black paper carrying at an intermediate point a sensitive film of a length corresponding to the image produced by the lens of the camera. The black paper is followed by another focusing screen and another length of black paper with an intermediate film thereon, and so on throughout the length of the roll. Because of the presence of a focusing screen for each length of sensitive film and a sufficient length of black paper to protect each piece of sensitive film from the effects of actinic light, the length of the roll is greater than where no focusing screens are provided in the roll itself, so that a roll of a certain size will contain a less length of sensitive film than the ordinary film roll.

The object of employing a length of black paper for each section of the sensitive film extending beyond opposite ends thereof for a considerable distance is to prevent access of actinic light to the film and at the same time permit the separation from the roll of any exposed films while other films remain unexposed to be used at some future time. By this means the exposed portions of the film may be developed without the necessity of awaiting the exposure of all the film in the roll as is necessary with the ordinary roll film of sufficient length to make a number of successive exposures.

Customary roll-film cameras have no opening at the back except the usual peephole for positioning the films, but some cameras are provided with special backs containing a ground glass focusing sheet with means for the reception of plate holders, so that the camera then becomes a plate camera in addition to its utilization as a film camera.

In order to utilize the film of the present invention it is necessary to provide means whereby the focusing sections may be exposed to view, and because of the type of camera employed and the inconvenience of using a focusing cloth, the back of the camera is provided with an opening of a size to expose the focusing screen, and this opening is provided with an expansible and collapsible hood whereby the eyes of the operator are shielded from extraneous light liable to hide the image. By providing the focusing hood with stiff portions in the nature of doors the focusing opening may be closed and protected about as efficiently as though there were no hole through the back of the camera body. Moreover, further protection is afforded by a dark slide which in the event of the camera being used with the focusing scale commonly provided may be pushed into place entirely covering the focusing opening, so that there is no liability of the entrance of actinic light into the camera from the back.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

Figure 7:
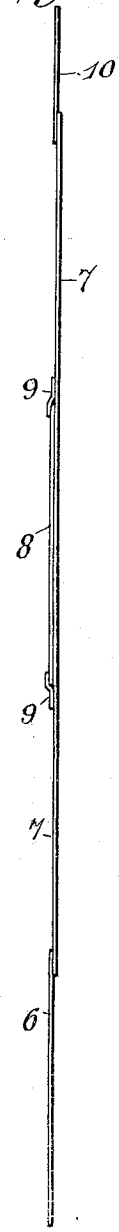
Figure 8:
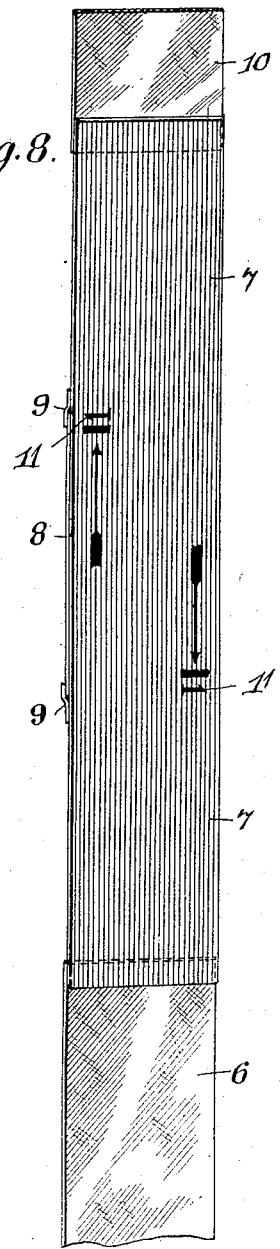

In the drawings:—Figure 1 is a perspective view from the rear of a camera equipped with the present invention. Fig. 2 is a rear elevation, with some parts broken away, of the camera of Fig. 1 with the focusing hood collapsed or closed. Fig. 3 is a longitudinal section on the line 3—3 of Fig. 2. Fig. 4 is a section on the line 4—4 of Fig. 2. Fig. 5 is a detail plan view of one of the hinge locking means with some parts broken back to show adjacent structure. Fig. 6 is a perspective view of the film side of a film roll embodying the present invention, and for the use of which the structure of the preceding figures is provided. Fig. 7 is an edge view on a larger scale than Fig. 6 of a fragment of the film roll. Fig. 8 is a perspective view of the portion of the film shown in Fig. 7 as seen from the rear side; that is, the side remote from the sensitive film sections.

Referring to the drawings there is shown a camera 1 adapted to use a film roll of the daylight loading type. As ordinarily constructed the film roll consists of an elongated strip of sensitive film sufficient for a suitable number of exposures, usually from six to ten for the particular size of camera for which the film roll is designed. The strip of sensitive film is carried by a strip of black paper, sometimes supplemented with a strip of red paper, but it will be sufficient for the purposes of the present invention to consider the paper vehicle as black paper, and it will be understood that wherever the term black paper is used it is intended to cover any suitable vehicle opaque to actinic light.

It is customary to provide a film rolled upon a spool 2 which is introduced into the camera and the preliminary length of black paper is then carried across the back of the camera just back of the focal plane and is attached to another spool 3 on the other side or end of the camera and is wound thereon until a length of film is brought into the focal plane to be exposed to the image produced by the lens of the camera. The positioning of the film is ascertained by observation through a small window 4 in the back of the camera, and made of some material such as red glass or celluloid opaque to actinic light.

The film of the present invention differs in material respects from the ordinary roll film in that there is provided a suitable length of black paper 5 attached at one end to the corresponding end of a length 6 of translucent or semi-transparent material, such as tracing linen or some form of semi-transparent paper or the like. The effective length of the semi-transparent section 6 is such as to correspond to the image produced by the lens in the focal plane of the camera, so that the user may ascertain the appearance of the image and accurately focus it without having recourse to the focusing scale. As is well known, the focusing scale is dependent upon the accuracy of distance from the object, especially in relatively short distances, and as the operator's judgment of distances is often faulty and many times there is no opportunity of measuring the distances there results a great waste of film because of poorly focused images.

Attached to the end of the focusing screen 6 remote from that to which the black paper 5 is attached is another length 7 of black paper, which length is considerably longer than the focusing screen 6 or the length of the effective image produced by the lens. About midway of the length 7 of black paper there is attached to one face of it a length 8 of sensitive film, which length may be approximately that of the picture to be produced. Because the film and black paper have to be rolled in a rather thin coil upon the spools 2 or 3, and also to keep it taut, it is customary to attach only the ends of the film to the black paper, and this may be done by narrow attaching strips 9, or in any other suitable manner. The sensitive film 8 is at all times backed up by the black paper 7 the same as the sensitive film of the ordinary roll film is backed up by black paper. That end of the length or strip 7 of black paper remote from the focusing strip 6 is attached to one end of another focusing strip 10 which may be similar in all respects to the strip 6 and the strip 10 may be followed by another strip of black paper carrying a section of sensitive film, and these parts may all be repeated as many times as needed to complete the entire film. The elongated strips 7 of black paper serve to protect the film sections 8 carried by them, so that it is quite feasible to remove the spool carrying exposed portions of the film and cut off a sufficient portion of the black paper strip 7 to shield the exposed film section or sections, and by the employment of another spool continue the use of the camera while the previously exposed film sections are ready for development. This avoids the necessity of awaiting the exposure of the entire length of film on a spool before the film can be developed.

In order to guide the operator each focusing section and the following film are similarly numbered or marked and the marking may follow the usual custom. Guiding marks are indicated at 11 and need no particular description.

The focusing sections 6 and the sensitive sections 8 are arranged on the same faces of the strips of black paper, so that they both move in the focal plane and hence there is the assurance that when an image is properly focused upon a focusing screen 6 it will be properly focused upon the sensitive film section 8.

The camera of the general type to which the present invention is particularly adapted has a removable back 12 and in order to provide for the use of the focusing screen this back is provided with a cut-out or opening 13 of a size to expose so much of the focusing screen as is needed for an inspection of the image produced by the lens in order that the image may be suitably focused upon the screen and properly arranged thereon. Fast to the rear face of the back 12 in surrounding relation to the opening 13 is a frame 14 of metal or other suitable material, and as the body of the camera is customarily covered with leather or other surfacing material the frame may be likewise covered, which covering is indicated at 15. Hinged to the frame 14 at opposite sides thereof are doors 16, 17, respectively, joined at their ends by webs 18, 19, respectively, of some suitable flexible material such as cloth or leather, and the webs 18 and 19 are so creased that they will fold together in compact form when the doors are closed one toward the other, the junction line of closure of the doors being midway of the width of the camera body. These doors may be made of sheet metal or other suitable material each reinforced by a strip 20 at the hinge edge, and this hinge may be formed by a continuation 21 of a cloth or leather covering 22 for each door. Each reinforcing or hinge strip 20 has one end 23 prolonged and preferably free from covering, so as to override the corresponding portion of the frame 14. At the same end of the frame there is secured a leaf spring 24 by a central rivet 25, while the ends of the spring are free and engage the prolongations 23 of the reinforcing or hinge strips 20. By making these strips of rectangular cross-section and especially the prolongations 23, the doors 16 and 17 may be opened into substantially perpendicular relation to the back of the camera and are there held by the engagement of the spring strip 24 with the prolongations 23, and the same occurs when the doors are closed, so that the doors are positively though elastically held in either the open or the closed position without the necessity of any special fastening devices.

The door 17 where adjacent to the window 4 is cut away, as shown at 26, to avoid hiding the window and the web 19 is inset, as shown at 27, to avoid in its folded position interference with the window.

The frame 14 is offset a short distance from the back 12 by filler strips 28 arranged about three sides of the frame, while at the fourth side this filler strip is omitted, so that a dark slide 29 may be inserted into the frame to entirely close the opening 13. Such dark slide 29 has a finger hold 30 by means of which it may be grasped to withdraw it when desired, and at one corner there is a cut-out 31 in this dark slide to avoid hiding the window 4.

The film roll or cartridge is introduced into the camera after removing the back 12 in the same manner that the ordinary film rolls or cartridges are introduced. After the forward end of the initial strip 5 of black paper is threaded into the winding spool, the back 12 is replaced and either by watching the marks on the roll through the window 4, or by pulling the slide 29 and opening the doors 16 and 17, the first focusing screen 6 is brought into place. Now the image may be focused upon the screen 6 and the camera adjusted as may be desired, so that the photograph to be taken will include what the operator wishes to include, all in the manner of focusing and adjusting plate cameras provided with the usual ground glass focusing screens, but no focusing cloth is needed, since the focusing hood surrounding the focusing opening through which the focusing screen is seen, sufficiently shades the screen to enable the operator to view the image satisfactorily.

While it is not necessary to push the slide 29 back into place and to close the focusing hood out of the way when the operator is ready to expose the film, these operations may be performed, since there is then no possibility of leakage of light into the back of the camera. The operator now manipulates the winding spool, winding the focusing screen, which has been used, thereon and a portion of the next strip 7 of black paper until the indications 11 on the rear face of the black paper become visible through the window 4, thus indicating that the sensitive film section 8 is now in position to be exposed to the image, it of course being understood that the shutter of the lens has previously been closed. When the camera is thus made ready, the operator may expose the adjusted film in the ordinary manner. On a further winding of the film carrying strip upon the winding spool the next focusing screen in order is brought into operative position in front of the opening 13, and another view may then be focused thereupon by a repetition of the operations already described, and the next film section in order may be exposed in the manner already described. These operations may be repeated until the total number of sensitive sections 8 has been exposed, whereupon the terminal strip of black paper is wound upon the winding spool and sealed in the usual manner to permit the removal of the cartridge or roll without damage to the film sections. Supposing, however, that it is desired to develop one or more of the exposed film sections before succeeding ones of the sections have been exposed, it is but necessary to sever the black paper strip 7 at a proper point when sufficient thereof has been wound on the winding spool to protect the preceding film section 8 and the length of the parts may be so proportioned that there will be enough of the same section of the strip 7 to permit its attachment to another winding spool with the focusing screen section in operative position. In this way it is possible to remove and separately develop each sensitive section 8 in the order of its occurrence in the cartridge, and this can be done without damage to any of the other sections not yet exposed. This is a feature of importance in the present invention greatly increasing the convenience of the camera in addition to the convenience of being able to focus the images as desired without recourse to the uncertain focusing scale and without the necessity of using plates and a ground glass focusing screen, or to depend upon a focusing screen placed out of the focal plane.

For the full benefit of the invention the focusing hood and the dark slide are useful in connection with the composite film roll.

The composite film roll is necessarily of a character which makes it liable to damage if it be readily accessible at all times through the focusing opening in the back of the camera, wherefore some rigid resistant device must be provided to ordinarily close the focusing opening. This closure, however, must be of a nature which permits its ready movement from closing relation to the focusing openings, and by the addition of the webs 18 and 19 the closure is readily converted into a focusing hood, thus doing away with the necessity of a focusing cloth, and yet sufficiently shading the focusing screen to permit satisfactory observation of the image thereon. Since it is not feasible to make the focusing hood both light proof and dust proof it is further advisable to provide the dark slide 29 which effectively excludes any straight rays of light which might possibly reach the sensitive film under some circumstances, and which may be made to fit with sufficient nicety to effectively exclude dust from entering the camera through the opening 13.

No claim is made in this case for the film *per se*, since such film is made the subject-matter of another application filed by me on September 9, 1915, under Serial No. 49,787.

What is claimed is:—

1. A film camera with a focusing opening at the back and a frame bordering said opening and provided with guides, a closure for said opening carried by the frame and movable to open and closed positions and having shading means coacting with the closure to protect the opening from access of strong light when the closure and the shading means are in the open position, and a dark slide adapted to the guides in the frame and of a size to cover the opening, said dark slide being adapted to traverse the opening between the focal plane of the camera and said closure.

2. A film camera provided with a focusing opening at the back having a focusing hood movable into and out of closing relation to the opening and also having guides exterior to the back of the camera, and a dark slide movable in the guides transversely of the focusing opening into and out of closing relation to said opening between the focal plane and the focusing hood.

3. A film camera provided with a focusing opening at the back, a normal closure for said opening on and exterior to the back of the camera and movable to open and closed positions, said closure having shading means with the closure and shading means opening to the full area of the focusing opening, guides between the back of the camera and bordering the focusing opening, and a dark slide movable along the guides transversely of the opening between the focal plane of the camera and the normal closure.

4. A film camera provided with a focusing opening at the back, a frame bordering said opening, matching closures hinged to opposite sides of the frame and movable from closed relation to the opening into positions substantially perpendicular thereto to expose the focusing opening fully, flexible webs joining corresponding ends of the hinged closures to act with the latter when in the open position to constitute a light shielding hood for the focusing opening, guides in the frame exterior to the back of the camera, and a dark slide movable in the guides across the focusing opening between the hinged closures and the focal plane of the camera.

5. A film camera having a focusing opening through the back, with a marginal frame for said opening having guides therein exterior to the back of the camera, a dark slide adapted to the guides and movable across the opening to the rear of the focal plane of the camera, and a normal closure for the opening having hinged members and connecting means associated therewith to constitute a focusing hood when in the open position, and automatic locking means for the hinged members acting to temporarily lock them in either the closed or the fully open position.

6. A focusing camera for roll films provided with a focusing opening through the back with the marginal frame for said opening, a dark slide adapted to the frame and movable across the opening, and doors hinged to the sides of the frame exterior to the path of the dark slide and movable into covering relation to the opening, said doors having their ends connected by webs foldable between the doors and the opening and together with the doors constituting a light shield for the focusing opening, each door being provided with an extension having flats and the camera being provided with elastic means in position to engage the flats on the doors to hold the latter in either the open or the closed position.

7. A focusing camera for roll films provided with a focusing opening at the back in position for observation of the image produced by the lens, said opening having a marginal frame with a slot or passage along one side, a dark slide adapted to the passage and movable across the openings into closing relation thereto, and doors hinged to opposite sides of the frame and movable into coactive closing relation to the focusing opening, said doors having extensions of the hinged edges provided with flats, and a spring strip engaging the extensions to hold the doors in the open or closed position, said doors having webs joining their like ends and coacting with the doors to constitute a light shielding hood for the focusing opening.

In testimony, that I claim the foregoing as my own, I have hereto affixed my signature in the presence of two witnesses.

ROBERT LANG.

Witnesses:
 FRED B. MOSER,
 GEO. W. REESE.

Copies of this patent may be obtained for five cents each, by addressing the "Commissioner of Patents, Washington, D. C."